May 12, 1925. 1,537,172
R. A. KOTTKE
HOLDER FOR PANS AND COVERS
Filed Oct. 15, 1923

Inventor
Rudolph A. Kottke

By B. F. Wheeler
Attorney

Patented May 12, 1925.

1,537,172

UNITED STATES PATENT OFFICE.

RUDOLPH A. KOTTKE, OF DETROIT, MICHIGAN.

HOLDER FOR PANS AND COVERS.

Application filed October 15, 1923. Serial No. 668,616.

*To all whom it may concern:*

Be it known that I, RUDOLPH A. KOTTKE, a citizen of the United States, residing at Detroit, in the county of Wayne and State of Michigan, have invented a new and useful Holder for Pans and Covers, of which the following is a specification.

This invention relates to kitchen utensils and particularly relates to holders for bake pans and pan covers.

It is the object of the invention to provide a holder for the aforesaid purpose having provision for adjustment to vary its dimensions according to the size of the pans or covers which it is to contain.

A further object is to adapt such a holder for production at low cost by forming the same entirely of wire.

In attaining these objects the invention contemplates forming a holder of two similar wire members of angular form, said members having over-lapping and slidably engaging parallel portions bent at their opposite ends to form lateral supports, and said members further having bent portions extending downwardly from the adjacent ends of said slidably engaging portions, and also bent at their lower ends to form lateral supports, the supports of both portions of each member co-acting to space said portions a suitable distance from a wall or the like to which the device is adapted to be secured.

A preferred embodiment of the invention is hereinafter described, and is illustrated in the accompanying drawing, wherein, Fig. 1 is a view in elevation of the improved holder, showing in full lines and in dash lines two of the various adjustments which may be given the device.

Figure 1:
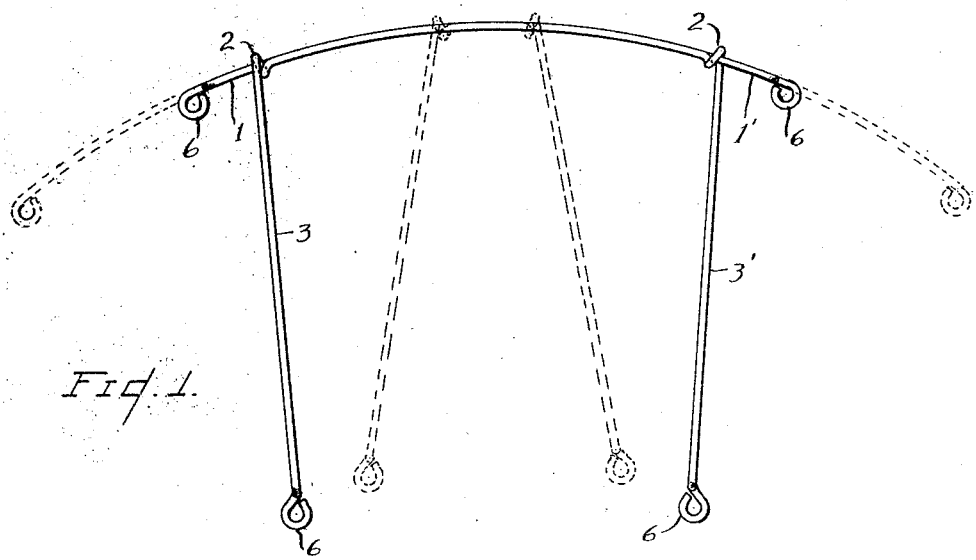
Figure 2:
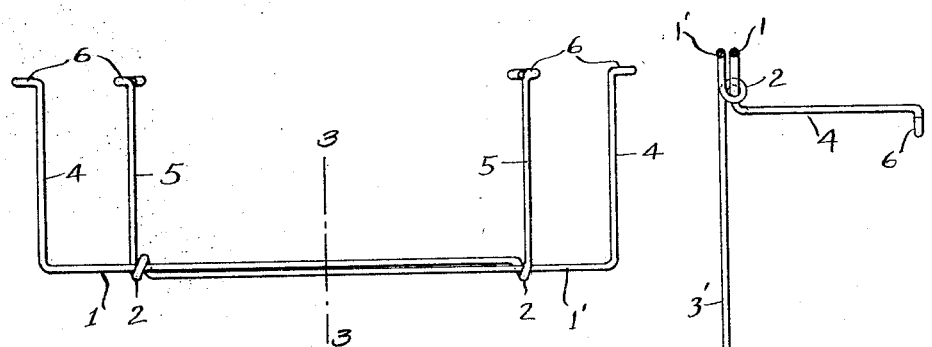
Fig. 2 is a top view of the same.
Figure 3:
Fig. 3 is a cross-section view on the line 3—3 of Fig. 2.

In these views the reference characters 1 and 1' designate two arcuate members formed preferably of heavy wire, having portions overlapping and slidably interengaging. This relation is established preferably by forming loops 2 upon the adjacent ends of said members, each member being passed loosely through the loop 2 of the other. From said loops, members 3 and 3' are extended integrally downward in a radial relation to said arcuate members, said members being movable to or from each other with relative slidable movement of the members 1 and 1'. The remote end portions 4 of the members 1 and 1', and the lower end portions 5 of the members 3 and 3' are similarly bent, substantially at right angles to said members, forming lateral supports for mounting the device upon a wall or door. Said supports terminate in loops forming eyes 6 through which screws or the like (not shown) may be passed to secure the holder to a door or supporting wall.

The described construction is one that may be easily and inexpensively manufactured, and which may also be readily mounted for use after having been adjusted to accommodate pans or covers of such size as it is desired to store in said holder. The arcuate form of the members 1 and 1' is desirable in that the overlapping central portions of said members engage the covers at or above their central portions so that they will not tip out, while the supports 4 of said members engage the edges of the pans or covers sufficiently below said central portions to leave a large extent of said edges exposed above said supports to facilitate gripping of said edges to place or remove the same.

What I claim is:

1. A holder for pans and covers comprising two complementary wire members, overlapping and slidably engaging each other, said members being downwardly bent at two opposite ends of said portions forming extensions, and being bent at the other opposite ends of said portions and at the end portions of said extensions, laterally from the common plane of said extensions and overlapping portions to form supports for the holder.

2. A holder as set forth in claim 1, said supports being terminally looped for engagement by securing elements.

3. A holder for pans or covers comprising two wire members having intermediate portions overlapping and slidably engaging each other, each of said members forming a loop for sliding engagement by the other member, said loops being at opposite ends of said portions, said members having downward extensions from said loops, and being bent at the other remote and opposite ends of said portions and at the end portions of said extensions, laterally from the common plane of said overlapping portions and extensions to form supports for the holder.

4. A holder as set forth in claim 3, the supports being terminally bent and looped to form securing feet.

5. A holder as set forth in claim 1, the overlapping members being of arcuate form.

In testimony whereof I sign this specification.

RUDOLPH A. KOTTKE.